US012024407B2

(12) United States Patent
Vighi et al.

(10) Patent No.: US 12,024,407 B2
(45) **Date of Patent: *Jul. 2, 2024**

(54) DRUM/RING GEAR ASSEMBLY FOR WINCHES WITH GEARED TRANSMISSION

(71) Applicant: Dana Motion Systems Italia S.R.L., Reggio Emilia (IT)

(72) Inventors: Alessandro Vighi, Reggio Emilia (IT); Giovanni Mariech, Reggio Emilia (IT); Orazio Amatucci, Reggio Emilia (IT); Sergio Artioli, Reggio Emilia (IT); Fabrizio Federici, Reggio Emilia (IT)

(73) Assignee: DANA MOTION SYSTEMS ITALIA S.R.L., Reggio Emilia (IT)

(*) Notice: Subject to any disclaimer, the term of this patent is extended or adjusted under 35 U.S.C. 154(b) by 377 days.

This patent is subject to a terminal disclaimer.

(21) Appl. No.: 17/446,948

(22) Filed: Sep. 3, 2021

(65) Prior Publication Data

US 2021/0395054 A1 Dec. 23, 2021

Related U.S. Application Data

(63) Continuation of application No. 16/632,280, filed as application No. PCT/EP2018/069407 on Jul. 17, 2018, now Pat. No. 11,148,918.

(30) Foreign Application Priority Data

Jul. 18, 2017 (IT) ........................ 102017000080867

(51) Int. Cl.
*B66D 1/00* (2006.01)
*B66D 1/22* (2006.01)

(52) U.S. Cl.
CPC ..................................... *B66D 1/22* (2013.01)

(58) Field of Classification Search
CPC .. B66C 1/22; B66C 1/225; B66C 1/70; B66C 1/7484; B66C 3/22; B66C 3/20; B66C 2700/0158; B66C 2700/0166
See application file for complete search history.

(56) References Cited

U.S. PATENT DOCUMENTS

| | | | | |
|---|---|---|---|---|
| 825,521 A | 7/1906 | Davis | | |
| 3,627,087 A * | 12/1971 | Eskridge | F16H 1/32 | 188/134 |
| 3,670,589 A * | 6/1972 | Carter | F16H 31/001 | 254/354 |

(Continued)

FOREIGN PATENT DOCUMENTS

GB 2102096 A 1/1983

OTHER PUBLICATIONS

ISA European Property Office, International Search Report and Written Opinion Issued in Application No. PCT/EP2018/069407, Oct. 10, 2018, WIPO, 9 pages.

*Primary Examiner* — Emmanuel M Marcelo
(74) *Attorney, Agent, or Firm* — McCoy Russell LLP

(57) ABSTRACT

A drum and ring gear assembly for winches with geared transmission which comprises a substantially cylindrical drum adapted to be actuated rotationally about its own longitudinal axis and a ring gear accommodated substantially coaxially inside the drum, which are mutually associated so as to rotate integrally about the longitudinal axis by virtue of connecting means; the connecting means is of the positive and/or direct friction type.

18 Claims, 11 Drawing Sheets

(56) References Cited

U.S. PATENT DOCUMENTS

| | | | | |
|---|---|---|---|---|
| 3,885,656 | A * | 5/1975 | Michling | B66D 1/22 254/901 |
| 4,118,013 | A | 10/1978 | Christison et al. | |
| 4,227,680 | A * | 10/1980 | Hrescak | B66D 1/22 475/140 |
| 4,310,146 | A * | 1/1982 | F'Geppert | B66D 1/22 475/329 |
| 4,328,954 | A * | 5/1982 | Logus | B66D 1/44 192/223.1 |
| 4,408,746 | A * | 10/1983 | Marsch | B66D 1/22 475/900 |
| 4,426,064 | A | 1/1984 | Healy | |
| 4,909,482 | A * | 3/1990 | Hofmann | B60D 1/38 254/326 |
| 5,368,279 | A | 11/1994 | Ottemann et al. | |
| 5,842,684 | A * | 12/1998 | Aho | B66D 1/08 254/323 |
| 5,927,691 | A * | 7/1999 | Ottemann | B66D 1/7484 475/12 |
| 6,042,086 | A * | 3/2000 | Roberts | B66D 1/7431 475/296 |
| 6,659,430 | B2 | 12/2003 | O'Fallon | |
| 7,270,312 | B1 | 9/2007 | Phipps | |
| 7,891,641 | B1 | 2/2011 | Miller | |
| 10,549,965 | B1 * | 2/2020 | Cui | B66D 1/24 |
| 2003/0151037 | A1 | 8/2003 | O'Fallon | |
| 2008/0312028 | A1 | 12/2008 | Haupt et al. | |
| 2011/0303886 | A1 * | 12/2011 | Cryer | B66D 1/22 254/340 |
| 2013/0056694 | A1 | 3/2013 | Wilkins et al. | |
| 2013/0313495 | A1 * | 11/2013 | Chenon | B66D 1/74 254/344 |
| 2014/0011627 | A1 * | 1/2014 | Lundrigan | F16H 63/34 475/326 |
| 2015/0210517 | A1 * | 7/2015 | Nishimoto | B66D 1/7436 254/323 |
| 2015/0284222 | A1 | 10/2015 | Hall et al. | |
| 2018/0111807 | A1 * | 4/2018 | Snider | B66D 5/00 |
| 2019/0016571 | A1 * | 1/2019 | Thirunarayana | H02K 7/1016 |
| 2019/0128379 | A1 * | 5/2019 | Hall | B66D 1/30 |
| 2020/0189889 | A1 * | 6/2020 | Vighi | B66D 1/58 |
| 2020/0361754 | A1 * | 11/2020 | Vighi | B66D 1/22 |
| 2021/0139298 | A1 | 5/2021 | Yu et al. | |

* cited by examiner

DRUM/RING GEAR ASSEMBLY FOR WINCHES WITH GEARED TRANSMISSION

CROSS REFERENCE TO RELATED APPLICATIONS

The present application is a continuation of U.S. National Phase application Ser. No. 16/632,280, entitled "DRUM/RING GEAR ASSEMBLY FOR WINCHES WITH GEARED TRANSMISSION" and filed on Jan. 17, 2020. U.S. application Ser. No. 16/632,280 is a National Phase of International Application PCT/EP2018/069407, entitled "DRUM/RING GEAR ASSEMBLY FOR WINCHES WITH GEARED TRANSMISSION," filed on Jul. 17, 2018. International Patent Application Serial No. PCT/EP2018/069407 claims priority to Italian Patent Application No. 102017000080867, filed on Jul. 18, 2017. The entire contents of each of the above-mentioned applications are hereby incorporated by reference in their entirety for all purposes.

BACKGROUND AND SUMMARY

The present invention relates to a drum/ring gear assembly for winches with geared transmission, preferably of the planetary gear type.

Winches for lifting loads are known, which are constituted substantially by a chassis for supporting a rotating drum onto/from which a flexible element is wound/unwound that can be connected to a load, and the drum is associated with means for actuating it in rotation about its own longitudinal axis. Such means for actuating comprise drive units that are supported by the chassis and which are provided with a motorized output shaft and a geared transmission assembly which is interposed between the motorized shaft and the drum.

Such geared transmission assembly can have, for example, at least one planetary gear reduction stage which consists of a driving sun gear wheel associated with the motorized shaft and meshed with one or more planet gear wheels, which are supported so that they can rotate about their respective axes by a planet gear carrier, which is fixed and coupled to the chassis, and which are, in turn, meshed with a driven ring gear which is connected to the drum for the transmission of rotation.

On the basis of the requirements of the specific application, the drum and the ring gear must be made with specific materials that ensure adequate chemical-physical properties and sufficient mechanical strength.

For example, for applications in a marine environment, the drum must be made of a material that has suitable characteristics of elongation and resistance to impact at low temperatures, while the ring gear must have adequate properties of mechanical strength and must be adapted to be subjected to surface hardening treatments.

Therefore it is known to make the drum and the ring gear separately, and assemble them together by way of threaded connecting elements.

In more detail, the drum is provided internally with a cylindrical seat with a bottom annular projection, along which the ring gear is inserted until it abuts against the annular projection. The drum and the ring gear are made mutually integral in rotation by way of a plurality of threaded connecting elements inserted longitudinally through the thickness of the ring gear until they engage with the end of the corresponding threaded shank in the aforementioned projection. A connection by indirect friction is therefore provided, by way of interposing standardized elements between the components to be made integral in rotation.

This conventional connection system is not devoid of drawbacks, among which is the fact that it requires complex work, both in providing the drum and the ring gear, which must be provided with respective holes made by means of machine tools, and also for the corresponding assembly, which entails the screwing of a plurality of threaded elements.

In addition, such connection system entails an increase in the radial space occupation, in that the ring gear must be dimensioned with a suitable thickness to ensure adequate characteristics of mechanical strength, despite the fact that the structure will be weakened by the longitudinal holes for inserting the threaded elements.

The aim of the present invention is to eliminate the above mentioned drawbacks of the conventional connection systems by devising a drum/ring gear assembly for winches with geared transmission that makes it possible to provide and subsequently assemble the drum and the ring gear, which are made of respective materials that are suitable for the specific applications for which they are designed, without requiring complex work either at the machining stage or at the assembly stage, so as to limit production costs and increase the efficiency thereof.

Within this aim, an object of the present invention is to contain the radial space occupation of the components, so as not to penalize the functionality or the possibilities for use of the winch.

Another object of the present invention is to make it possible to provide the components both by way of machining operations, and by way of forming.

Another object of the present invention is to provide a simple structure that is easy and practical to implement, safe in use and effective in operation, and at low cost.

This aim and these objects are achieved by the present drum/ring gear assembly for winches with geared transmission.

This aim and these and other objects are all achieved by a winch with geared transmission which incorporates a drum/ring gear assembly according to the invention.

BRIEF DESCRIPTION OF THE FIGURES

Further characteristics and advantages of the present invention will become better apparent from the detailed description of some preferred, but not exclusive, embodiments of a drum/ring gear assembly for winches with geared transmission, which are illustrated for the purposes of non-limiting example in the accompanying drawings wherein.

DETAILED DESCRIPTION

Figure 1:
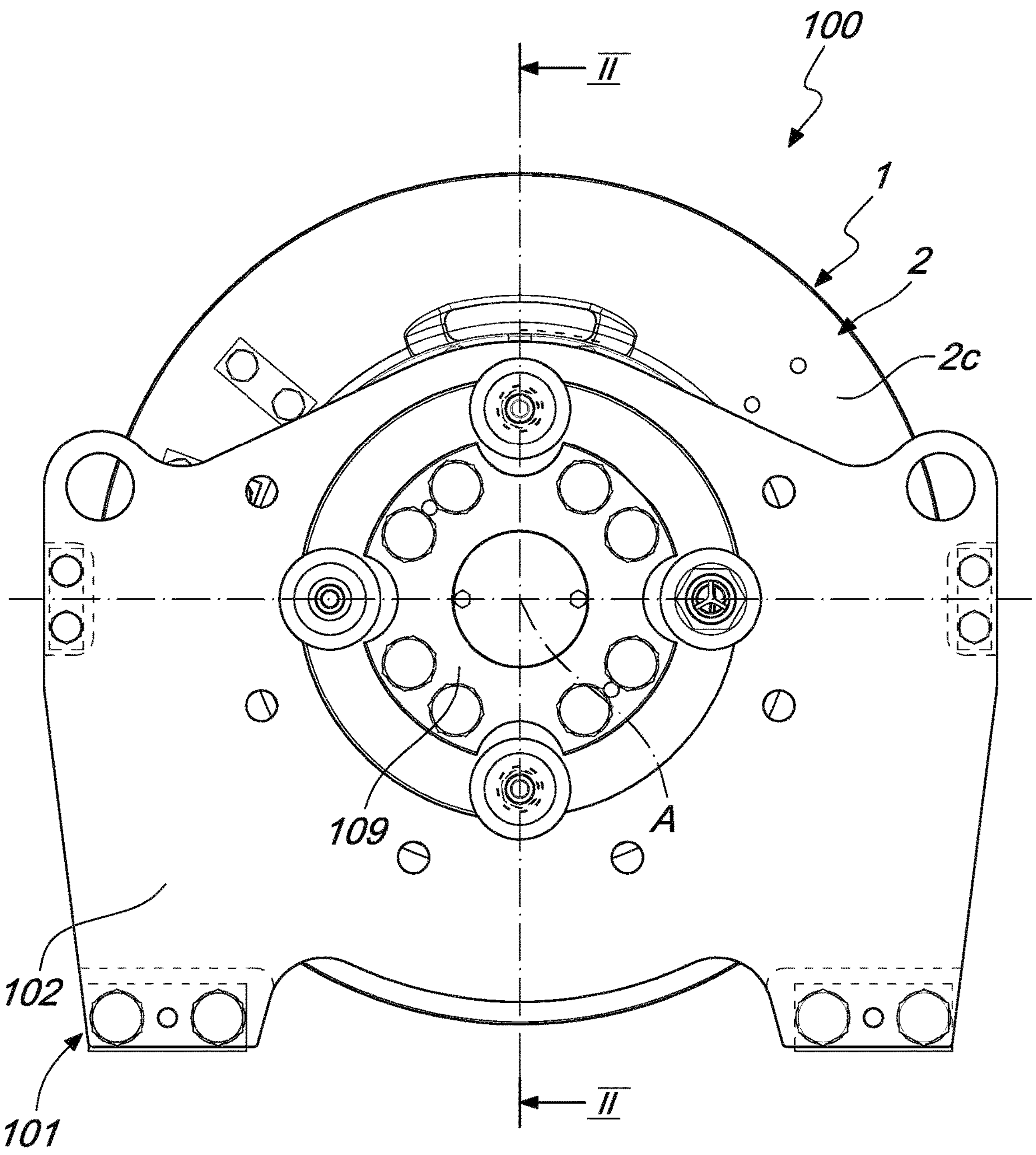
FIG. 1 is a side view of a winch with geared transmission incorporating a drum/ring gear assembly according to the invention.

With particular reference to the figures, the reference numeral 1 generally designates a drum/ring gear assembly for winches with geared transmission, preferably of the planetary gear type.

The assembly 1 comprises a drum 2 adapted to be actuated rotationally about its own longitudinal axis A and a ring gear 3 accommodated substantially coaxially inside the drum 2, which are mutually associated so as to rotate integrally about the axis A by way of connecting means 4 of the positive and/or direct friction type.

The drum 2 consists of a substantially cylindrical and internally hollow body to define an axial hole 2*a* along the axis A and an external side wall 2*b*, which can be provided with one or two sides 2*c* at the ends.

The ring gear 3 consists substantially of a cylindrical collar which is provided internally with at least one annular toothed band 5. In the shown embodiments, there are two toothed bands 5 inside the ring gear 3, which is adapted to mesh with respective pinions.

It should be noted that the definition of "positive connection" is a method of rigid mechanical connection in which the physical presence of adjacent components limits the possibility of relative movement between them. Such type of connection can be direct, when it is the very shape structure of the components that provides the connection, or indirect, when special connecting elements are.

The definition of "direct friction connection", on the other hand, is a method of rigid mechanical connection in which it is the friction reaction that develops between the surfaces of two components in forced mutual contact that provides their coupling.

The drum 2 and the ring gear 3 are therefore made as separate components with respective suitable materials on the basis of the requirements of the specific application and are subsequently assembled so as to obtain a connection limited in the rotation about the axis A.

The drum 2 and the ring gear 3 can be made, for example, of cast iron or of steel by way of machining operations or forming.

Figure 2:
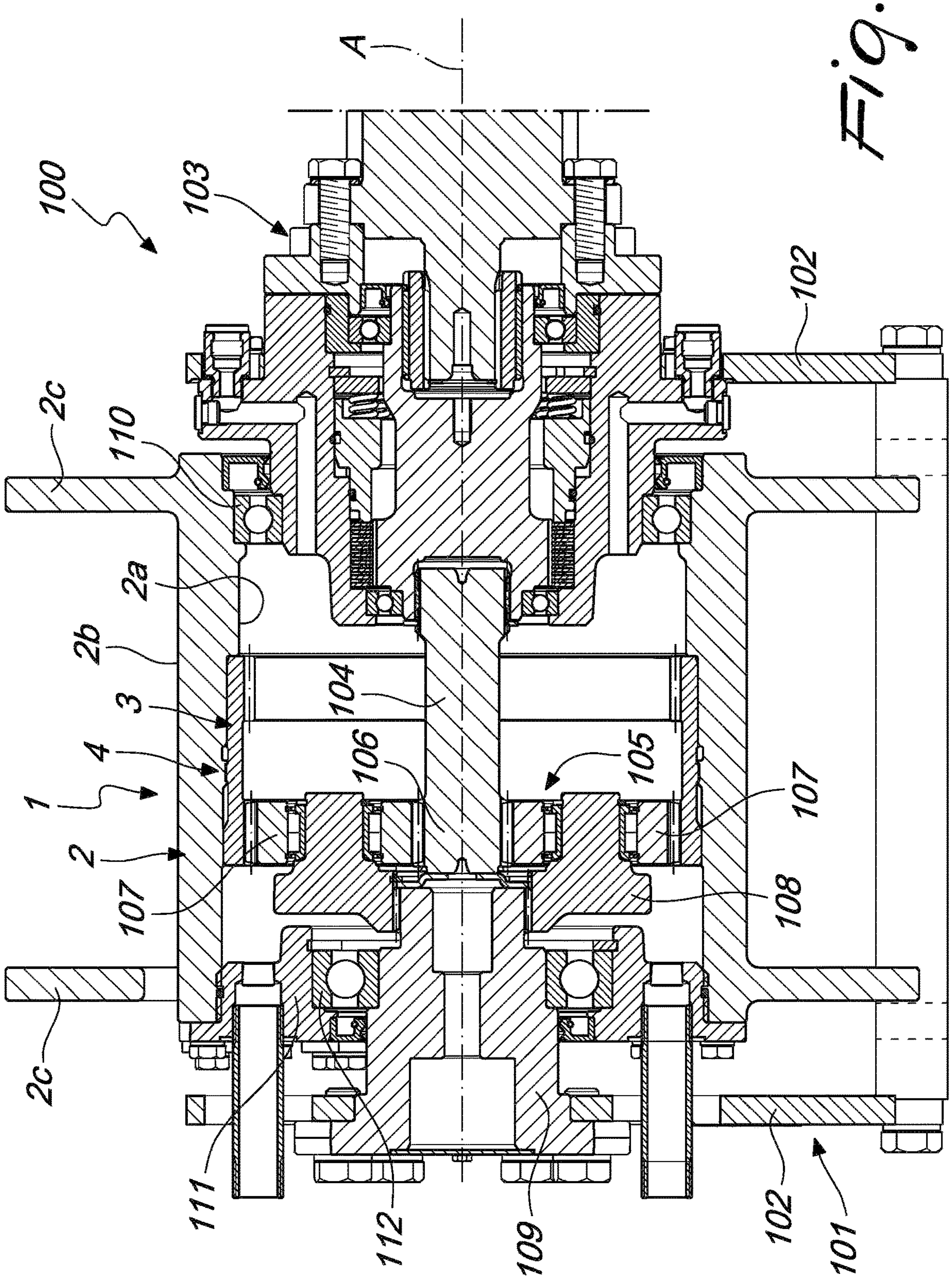
FIG. 2 is a cross-sectional view taken along the line II-II in FIG. 1 of a first embodiment of the drum/ring gear assembly according to the invention.
Figure 3:
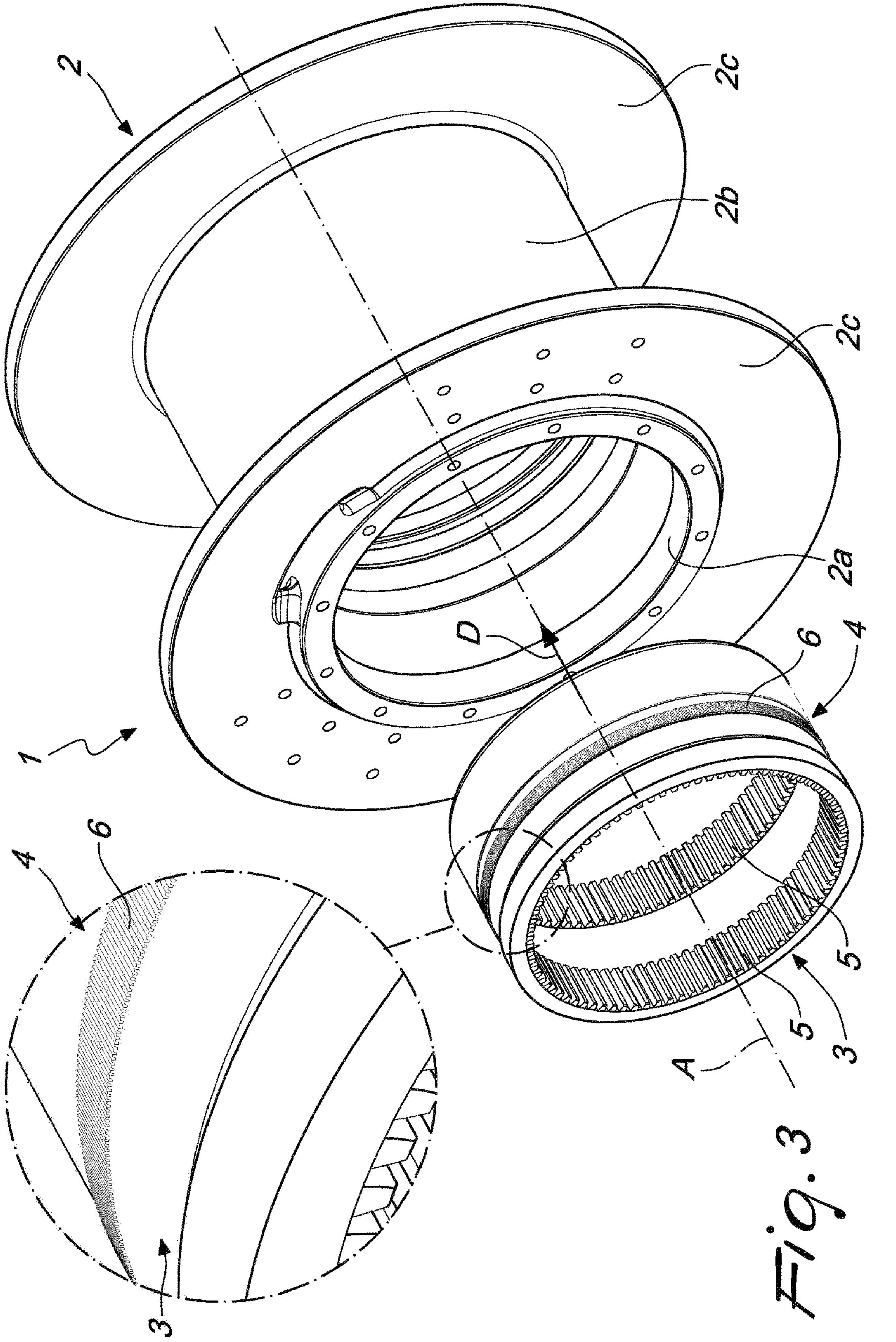
FIG. 3 is an exploded perspective view of the first embodiment of the assembly according to the invention.
Figure 4:
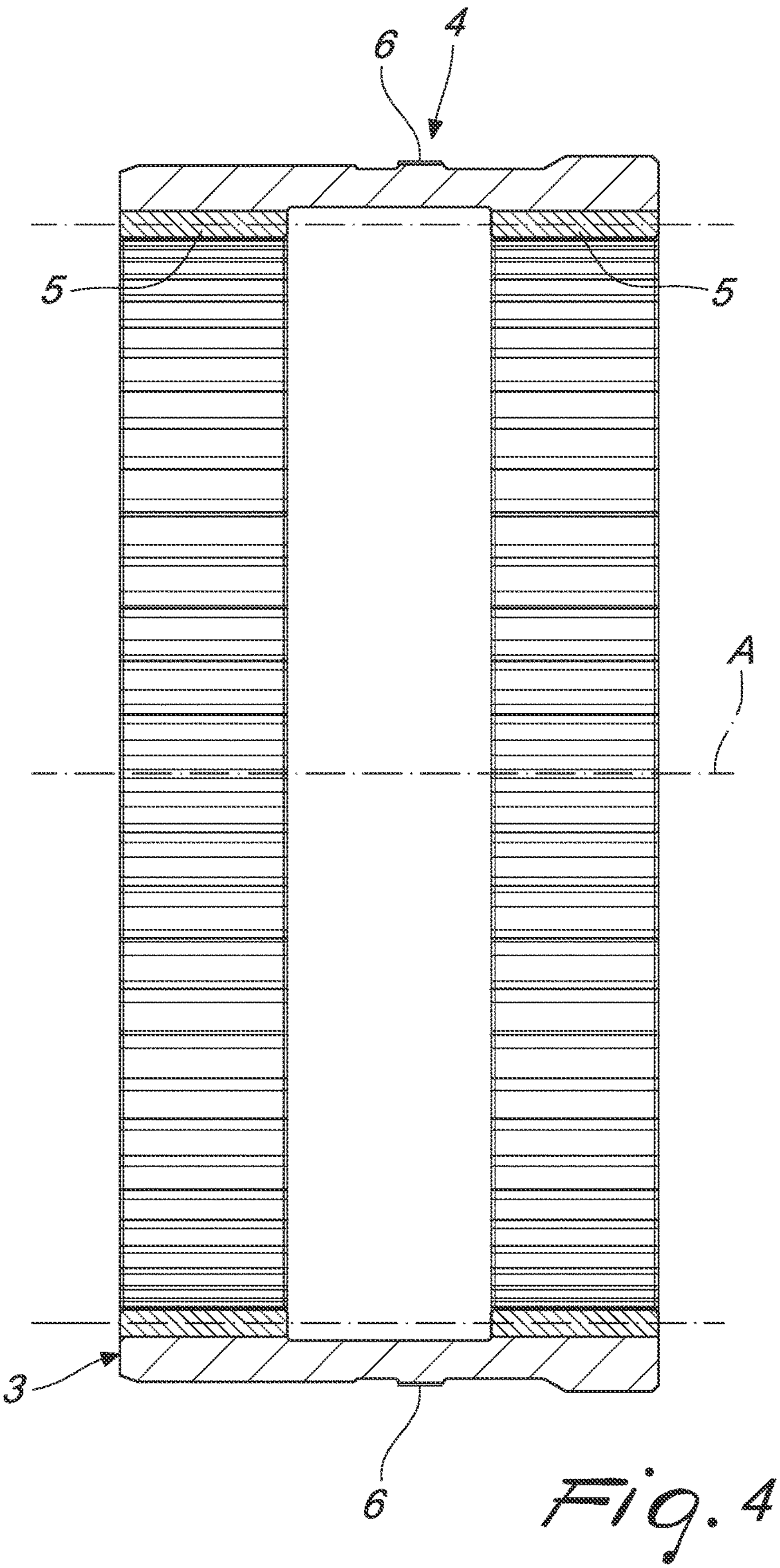
FIG. 4 is a cross-sectional view taken along a longitudinal plane of the ring gear of the assembly in FIG. 3.
Figure 5:
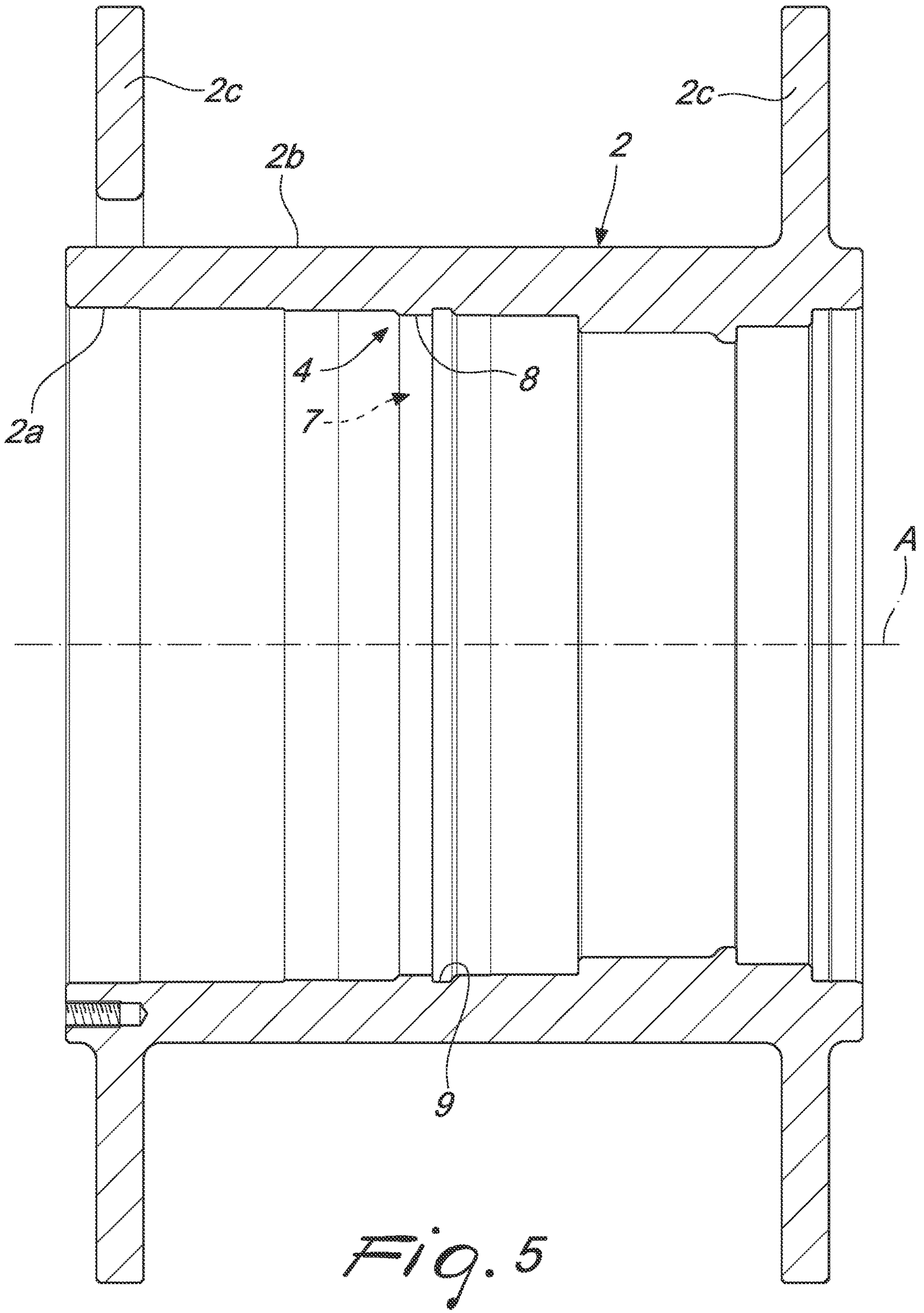
FIG. 5 is a cross-sectional view taken along a longitudinal plane of the drum of the assembly in FIG. 3.

The assembly 1 is intended to be incorporated in a winch 100 with geared transmission, preferably of the planetary gear type, as shown in FIGS. 1 and 2 and only briefly described below since it is known to the person skilled in the art.

The winch 100 comprises, substantially, a supporting chassis 101 provided with a pair of mutually opposite walls 102 between which the drum 2 is supported so that it can rotate, on the side wall 2*b* of which a flexible element is wound/unwound that can be connected to a load, not shown. The drum 2 is associated with actuating means for rotation about the axis A, which comprise drive units 103 that are supported by one of the walls 102 and are provided with a motorized output shaft 104 lying along the axis A and a planetary gear transmission assembly 105 which is interposed between the motorized shaft and the drum 2.

The transmission assembly 105 has at least one planetary gear reduction stage that extends around the axis A and consists of a driving sun gear wheel 106, keyed onto or defined so as to be integral with the end of the motorized shaft 104 and meshed with one or more planet gear wheels 107, which are supported so that they can rotate about their respective axes by a planet gear carrier 108, which is fixed and coupled to the chassis, and which are, in turn, meshed with the driven ring gear 3 which is connected to the drum 2 for the transmission of rotation about the axis A.

The planet gear carrier 108 is connected to the wall 102 arranged opposite the wall that supports the drive units 103 by way of a reaction pivot 109 according to methods known to the person skilled in the art.

The drum 2 has one side supported so that it can rotate by the drive units 103 by way of interposition of a first bearing 110, and the opposite side is integrally associated in rotation with a flange 111 which is supported by the reaction pivot 109 so that it can rotate by way of interposition of a second bearing 112.

The possibility is not ruled out, however, that the assembly 1 can be incorporated into a winch 100 that has a geared transmission assembly of the ordinary (not planetary gear) type, such as for example a transmission assembly with parallel, fixed-axis gears, which has a pinion in output that meshes with the ring gear 3.

In a first embodiment (FIGS. 1-5), the connecting means 4 comprises a first grooved, or toothed, profile 6, associated with the external surface of the ring gear 3, and a second grooved, or toothed, profile 7, substantially matching up with the first profile and associated with the internal surface of the drum 2, which are mutually coupled so as to be integral in rotation about the axis A, the drum 2 and the ring gear 3.

The cross-section of each one of the grooved profiles 6 and 7 features respective crests interleaved with grooves in which the crests of the other profile are accommodated.

Preferably the first and second grooved profiles 6 and 7 are defined integral, respectively, with the ring gear 3 and with the drum 2 and they extend along at least one annular section of the ring gear and of the drum.

The possibility is not ruled out, however, that the profiles 6 and 7 can affect only one or more sectors of the annular section of the ring gear 3 and of the drum 2.

In the shown embodiment, the first and second grooved profiles 6 and 7 are coupled with an interference-fit coupling, the second grooved profile 7 being defined on the drum 2 by deformation and/or removal of material following the keying of the ring gear 3 provided with the first grooved profile 6 and inserted axially along the drum 2.

The ring gear 3 (FIG. 4) is, in fact, provided with the first grooved profile 6 at an annular section positioned longitudinally between the two toothed bands 5.

The drum 2 (FIG. 5) is provided on the internal surface with an annular projection 8 that protrudes radially toward the axis A and is substantially cylindrical, and with an adjacent annular groove 9.

During the forced insertion in the direction D of the ring gear 3 along the axial hole 2*a* of the drum 2, the first grooved profile 6 interferes with the annular projection 8, creating the second grooved profile 7 by way of deformation and/or removal of material. The annular groove 9, arranged behind the annular projection 8 along the direction D, acts as a discharge route for the material removed from the drum 2. In this manner a positive and direct friction connection is created between the drum 2 and the ring gear 3, the profiles 6 and 7 being coupled with no play.

The possibility is not ruled out, however, that the first and second grooved profiles 6 and 7 can be preformed, respectively, on the ring gear 3 and on the drum 2 and, therefore, be coupled with play thus providing a form-fit coupling (positive connection). In this case, additional elements must be provided to axially constrain the relative sliding between the drum 2 and the ring gear 3.

Figure 6:
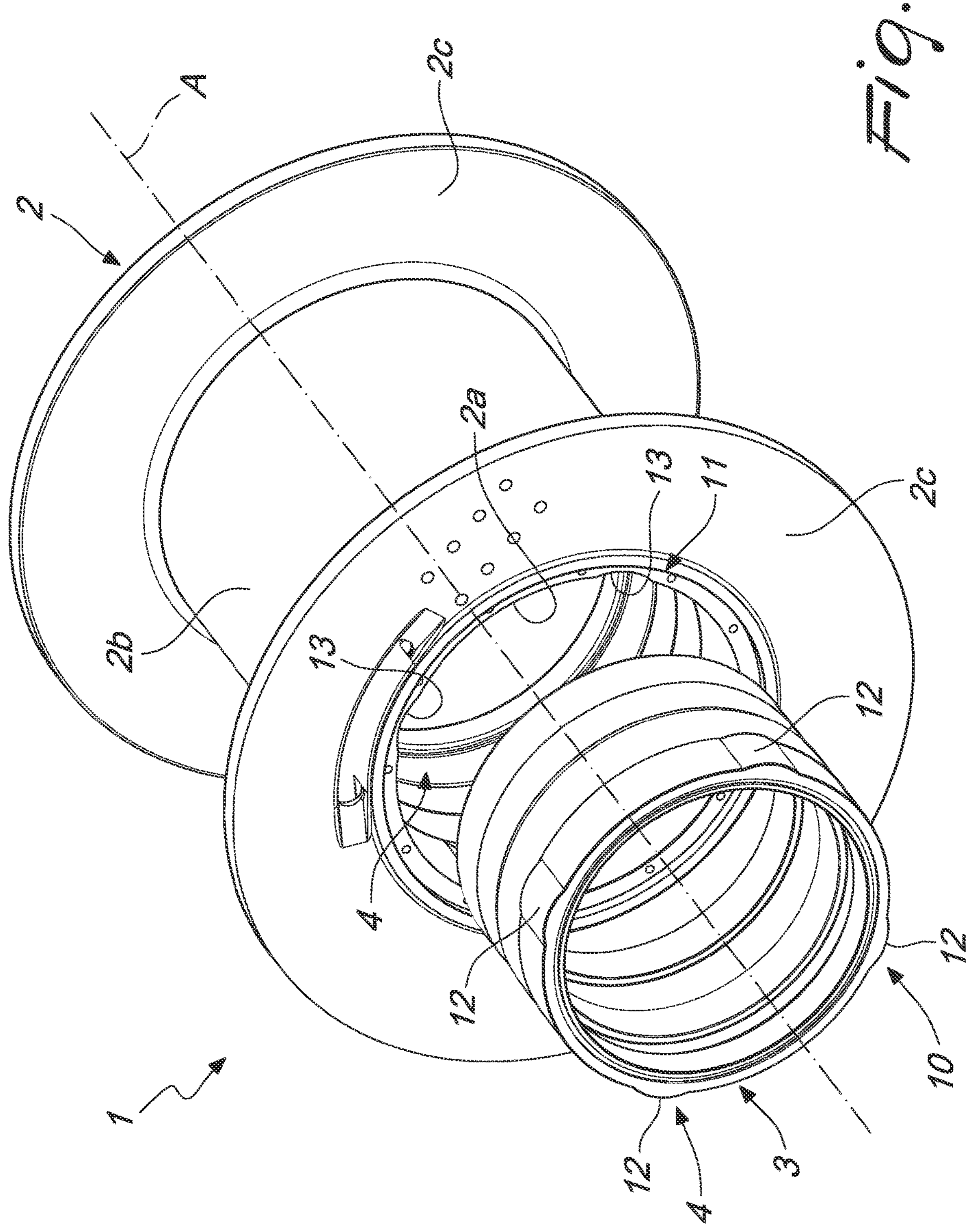
FIG. 6 is an exploded perspective view of a second embodiment of the assembly according to the invention.
Figure 7:
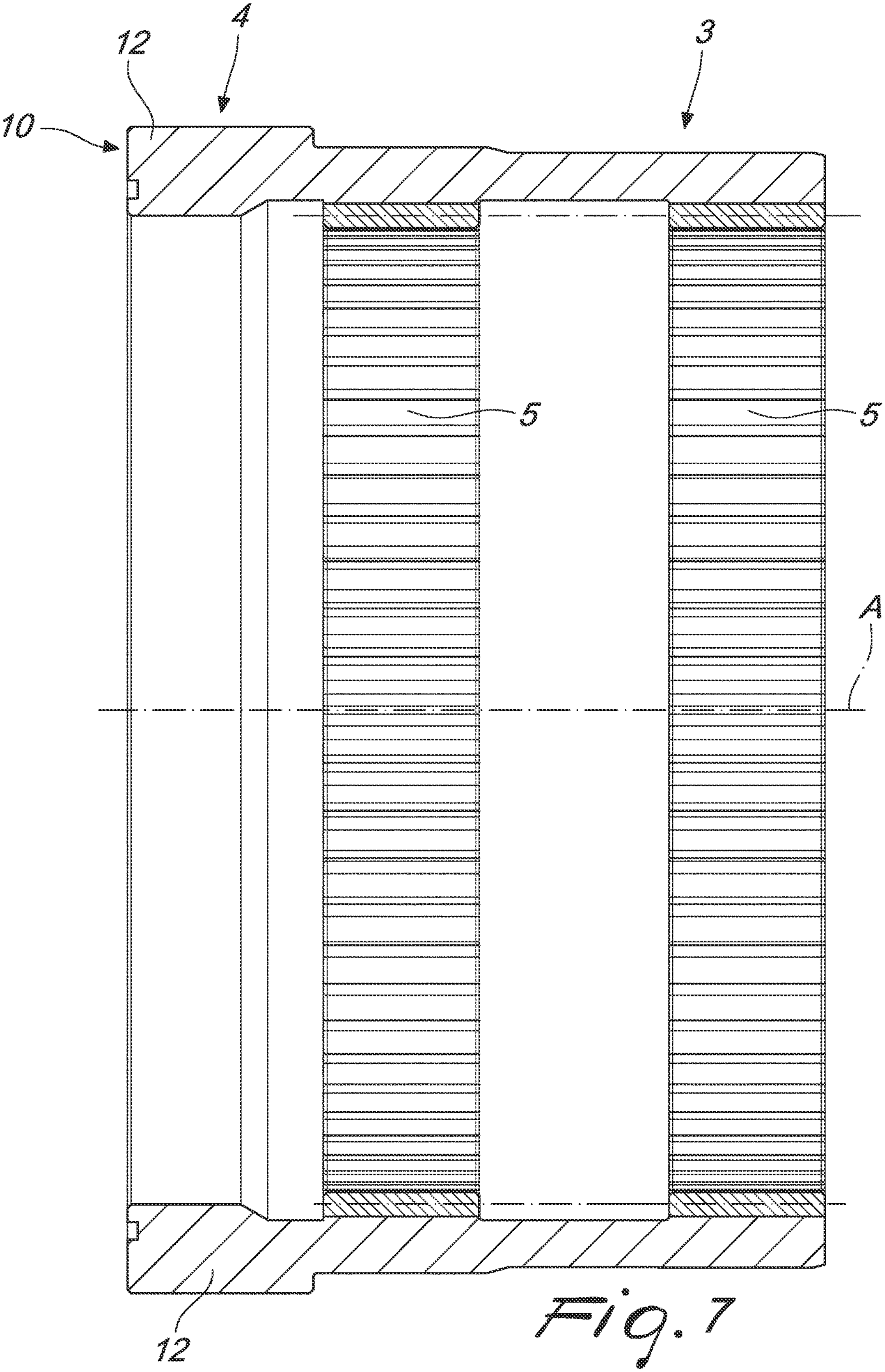
FIG. 7 is a cross-sectional view taken along a longitudinal plane of the ring gear of the assembly in FIG. 6.
Figure 8:
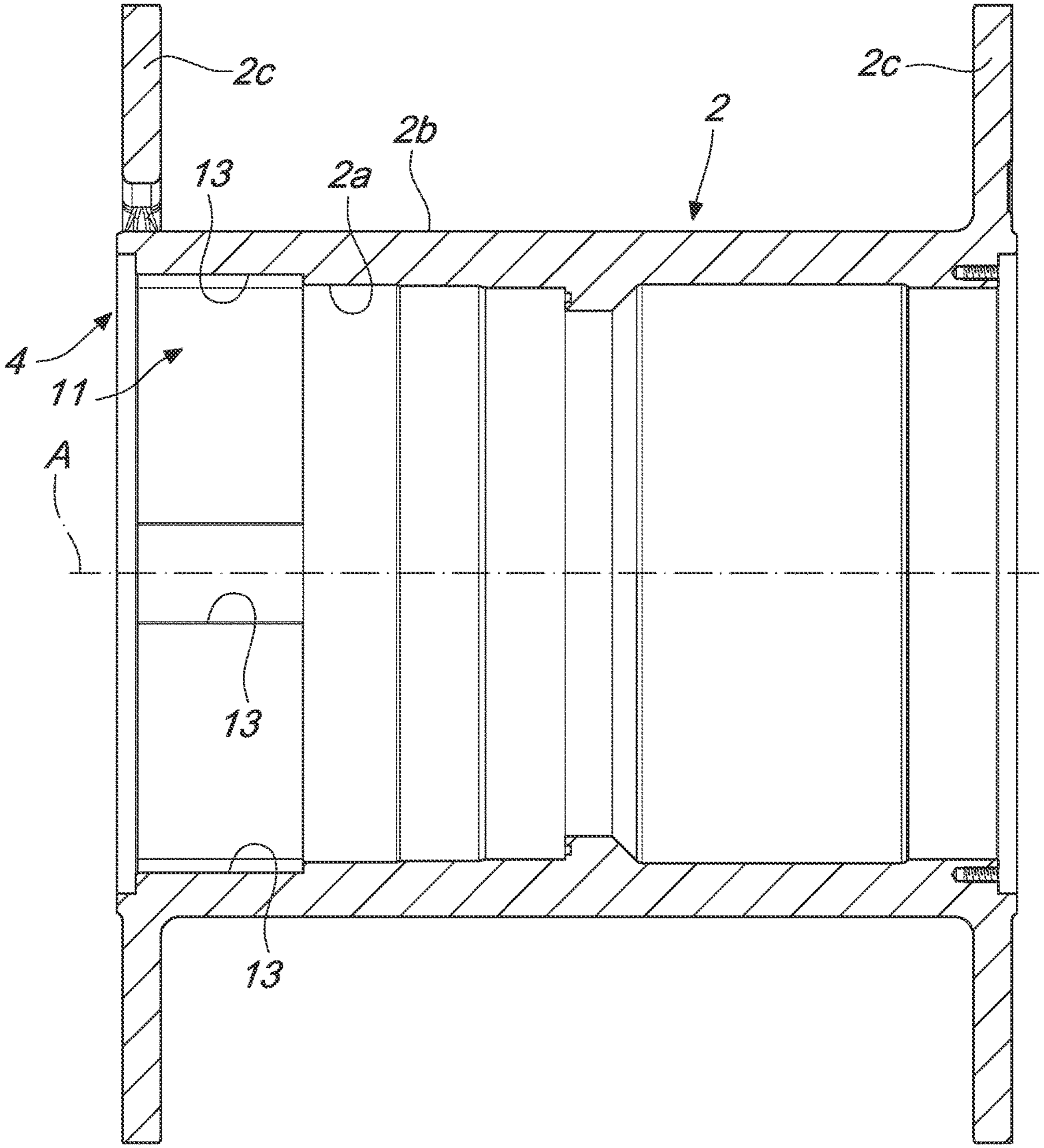
FIG. 8 is a cross-sectional view taken along a longitudinal plane of the drum of the assembly in FIG. 6.

In a second embodiment (FIGS. 6-8), the connecting means 4 comprises a first contoured profile 10, associated with the external surface of the ring 3, and a second contoured profile 11, substantially matching up with the first contoured profile and associated with the internal surface of the drum 2, which are mutually coupled so as to be integral in rotation about the axis A the drum 2 and the ring gear 3.

Preferably the first and second contoured profiles 10 and 11 are defined integral, respectively, with the ring gear 3 and with the drum 2 and they extend along at least one annular section of the ring gear and of the drum.

In more detail, the cross-section of one of the first and second contoured profiles 10 or 11 is provided with at least one lobe 12 that protrudes radially and with a longitudinal extension and the cross-section of the other one of these profiles is provided with at least one corresponding recess 13 which is recessed radially with a longitudinal extension, the lobe 12 being accommodated at the recess 13 so as to provide a male-female coupling with play (positive connection) or with interference (positive and direct friction connection).

Preferably there are a plurality of lobes 12 and of corresponding recesses 13, distributed in an annular manner.

The possibility is not ruled out, however, that the profiles 10 and 11 can affect only one or more sectors of the annular section of the ring gear 3 and of the drum 2.

In the shown embodiment, the first contoured profile 10 is of male type and the second contoured profile 11 is of female type.

In fact, the ring gear 3 is provided with four lobes 12 which protrude from its external surface at one end and are angularly spaced apart in pairs by 90°, and the drum 2 is provided with corresponding recesses 13 along the axial hole 2*a*.

The possibility is not ruled out however that the drum 2 can incorporate the male profile and the ring gear 3 can incorporate the female profile, or that the contoured profiles 10 or 11 can have a different number, shape structure, or distribution of the lobes 12 and of the corresponding recesses 13.

Figure 9:
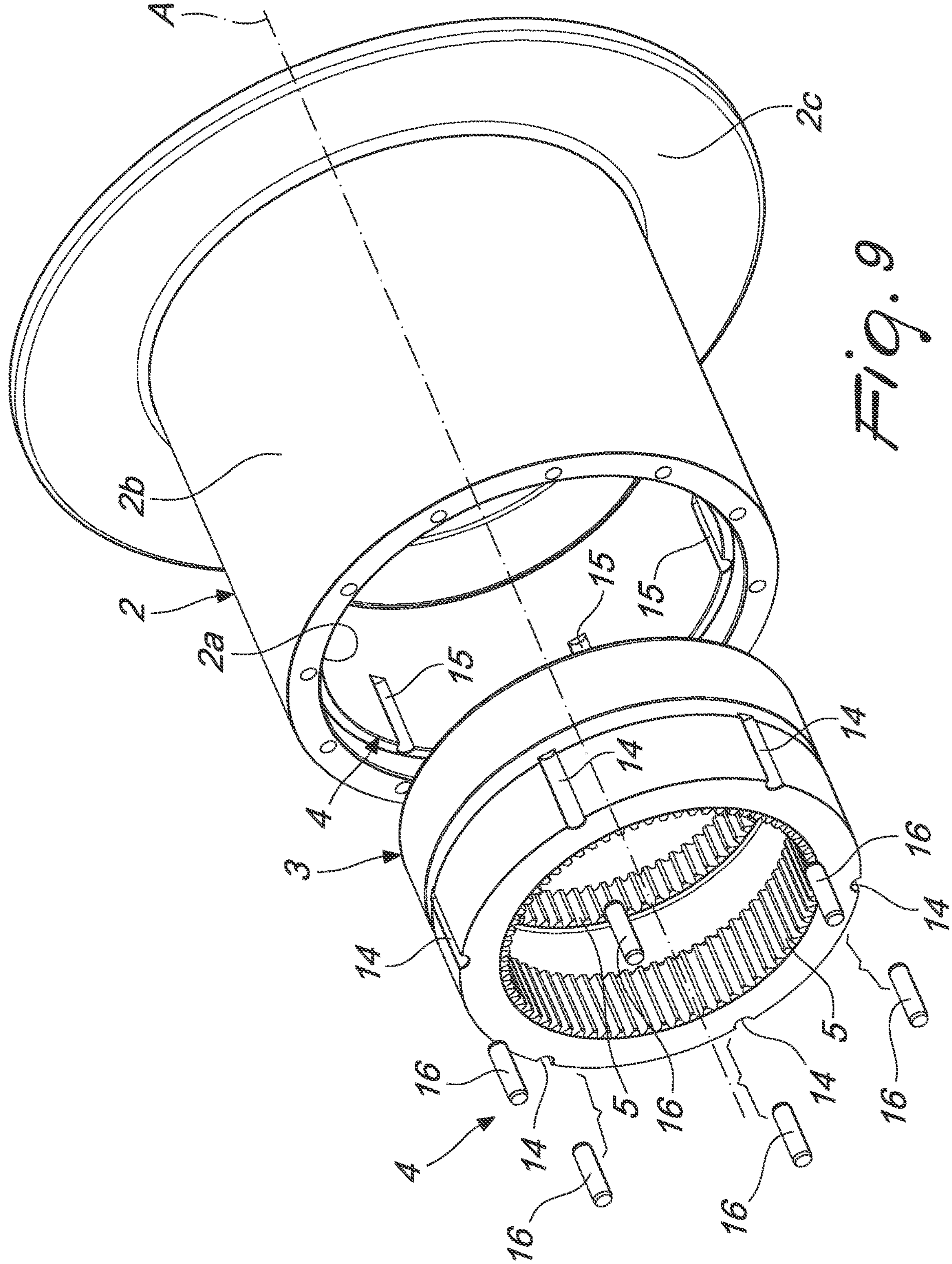
FIG. 9 is an exploded perspective view of a third embodiment of the assembly according to the invention.
Figure 10:
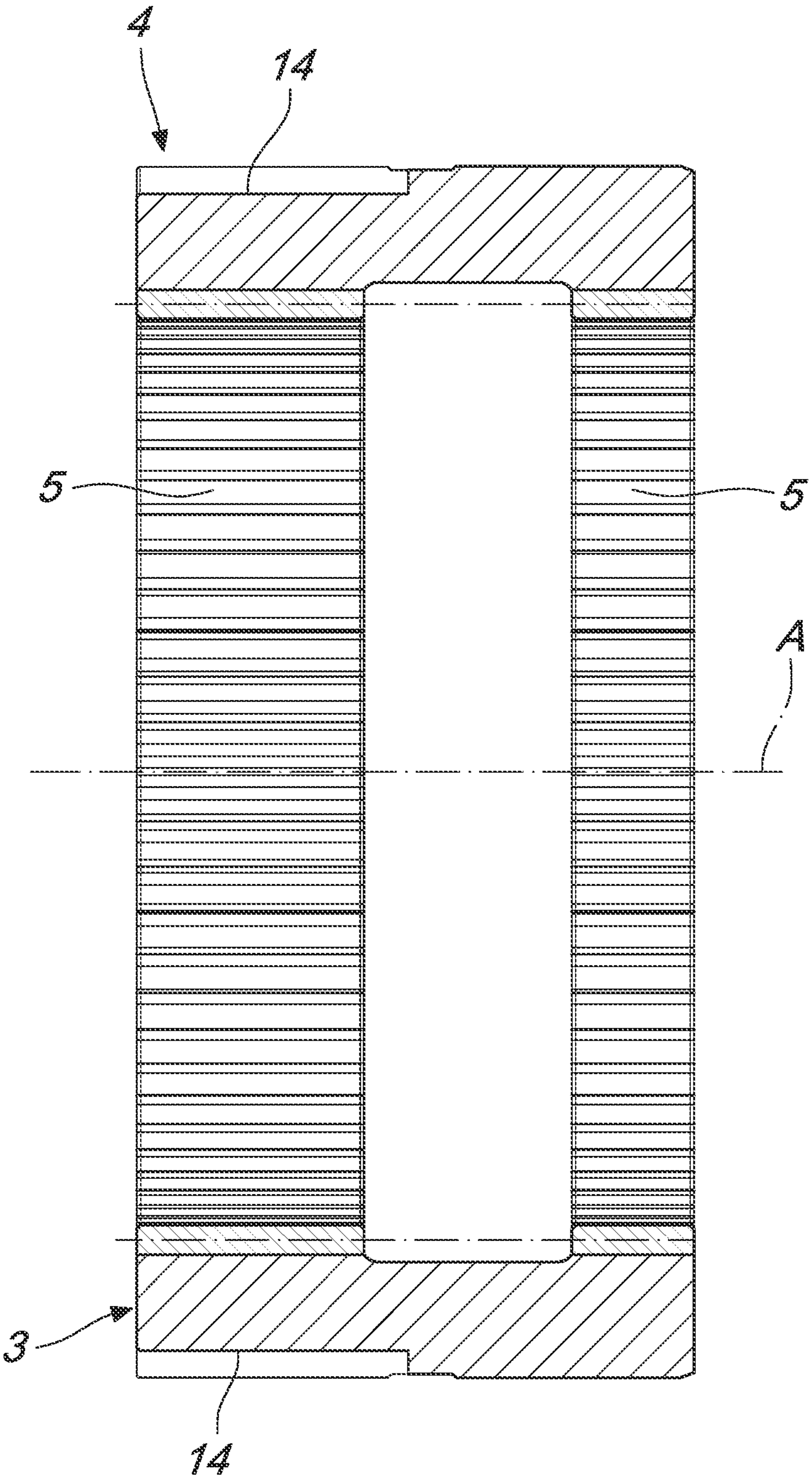
FIG. 10 is a cross-sectional view taken along a longitudinal plane of the ring gear of the assembly in FIG. 9.
Figure 11:
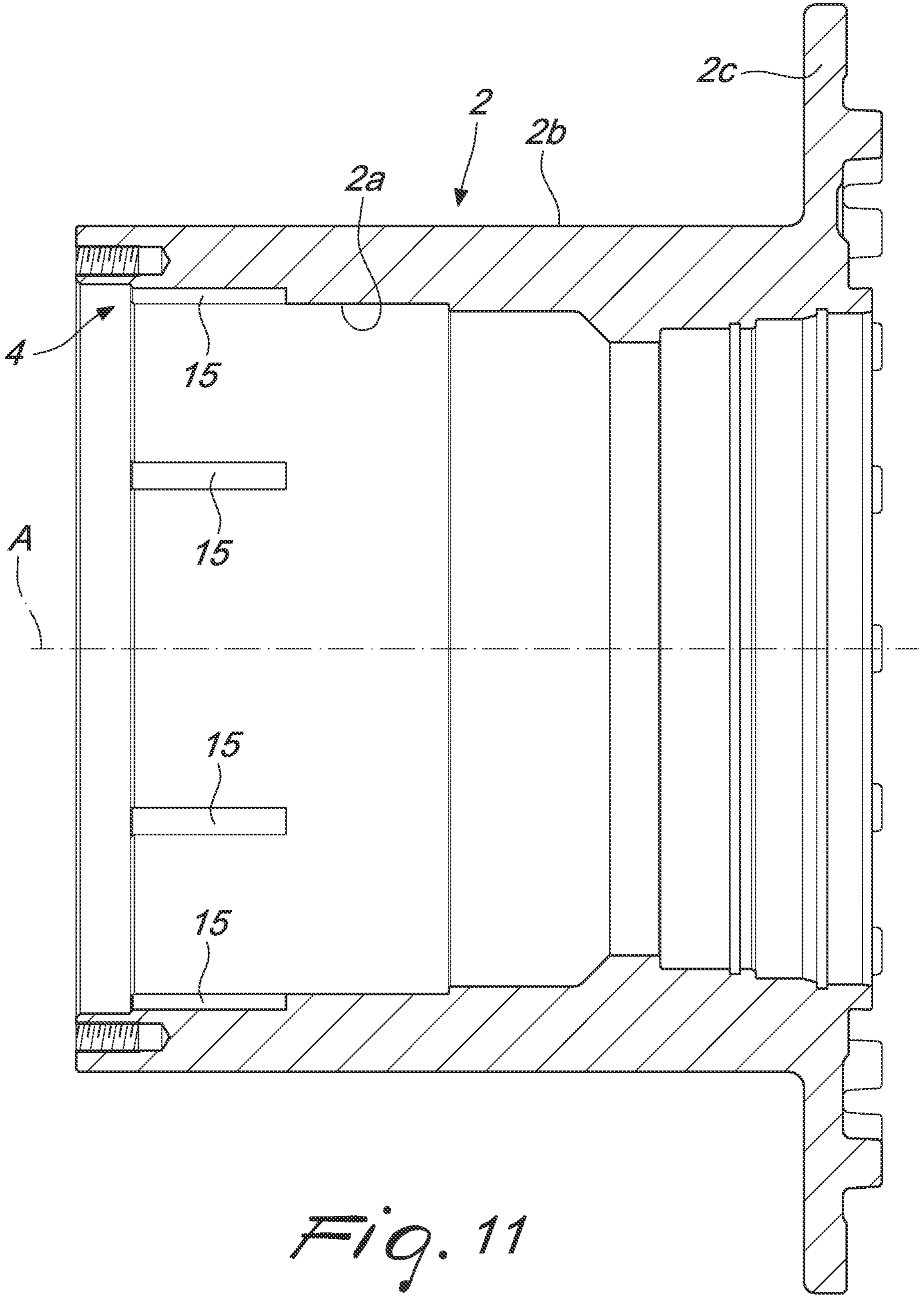
FIG. 11 is a cross-sectional view taken along a longitudinal plane of the drum of the assembly in FIG. 9.

In a third embodiment (FIGS. 9-11) the connecting means 4 comprises at least one first recess 14, associated with the external surface of the ring gear 3, at least one second recess 15, associated with the internal surface of the drum 2 and facing the at least one first recess 14, so as to define at least one accommodation seat, and at least one respective obstacle element 16 inserted to engage with said seat.

Preferably the at least one first recess 14 and the at least one second recess 15 are defined integrally, respectively, with the ring gear 3 and with the drum 2.

The connecting means 4 can have a plurality of first recesses 14, each one of which faces a respective second recess 15 so as to define an accommodation seat for a corresponding obstacle element 16.

In this case the first and second recesses 14 and 15 are distributed along at least one annular section, respectively, of the ring gear 3 and of the drum 2.

The possibility is not ruled out, however, that the recesses 14 and 15 can be provided only on one or more sectors of the annular section of the ring gear 3 and of the drum 2.

In the embodiment shown there are six first recesses 14 and six corresponding second recesses 15 that are distributed angularly and equally spaced apart about the axis A at one end of the drum 2 and of the ring gear 3 and have an axially elongated extension. The obstacle elements 16, in fact, are constituted by respective pins that act as tabs (positive connection) interposed between the drum 2 and the ring gear 3.

The possibility is not ruled out that the connecting means 4 can have a different number, shape, or distribution of the recesses 14 and 15 and of the corresponding obstacle elements 16.

Furthermore it is possible to have further embodiments of the assembly 1 in which, for example, the connecting means 4 are exclusively of the friction type, for example in coupling with interference between conical surfaces defined inside the drum 2 and outside the ring gear 3.

In practice it has been found that the invention as described achieves the intended aim and objects and, in particular, attention is drawn to the fact that the assembly according to the invention makes it possible to provide the drum and the ring gear as separate components made of respective suitable materials as a function of the intended use and to assemble them together for the transmission of rotation without requiring complex or lengthy operations, so as to reduce the costs and increase the efficiency of the production process.

Furthermore the drum/ring gear assembly according to the invention does not entail an increase in the radial space occupation of the components.

In addition, the assembly according to the invention makes it possible to provide the drum and the ring gear using different technologies, such as for example machining operations or forming.

The invention, thus conceived, is susceptible of numerous modifications and variations, all of which are within the scope of the appended claims.

Moreover, all the details may be substituted by other, technically equivalent elements.

In practice the materials employed, as well as the contingent dimensions and shapes, may be any according to requirements without for this reason departing from the scope of protection claimed herein.

The disclosures in Italian Patent Application No. 102017000080867 from which this application claims priority are incorporated herein by reference.

Where technical features mentioned in any claim are followed by reference signs, those reference signs have been included for the sole purpose of increasing the intelligibility of the claims and accordingly, such reference signs do not have any limiting effect on the interpretation of each element identified by way of example by such reference signs.

The invention claimed is:

1. A drum and ring gear assembly for winches with geared transmission which comprises:

a drum that is substantially cylindrical and adapted to be actuated rotationally about a longitudinal axis of the drum; and a ring gear accommodated substantially coaxially inside said drum, where the drum and the ring gear are mutually associated so as to rotate integrally about said longitudinal axis by virtue of a connecting means, and wherein said connecting means is of a positive and/or a direct friction type, wherein said connecting means comprises at least one first recess, associated with an external surface of said ring gear, and at least one second recess, associated with an internal surface of said drum and facing said at least one first recess, so as to define at least one seat for accommodation of at least one corresponding obstacle element.

2. The assembly according to claim 1, wherein said connecting means comprises a first grooved profile, associated with the external surface of said ring gear, and a second grooved profile, substantially matching up with the first grooved profile and associated with the internal surface of said drum, which are mutually coupled.

3. The assembly according to claim 2, wherein said first and second grooved profiles are defined integrally, respectively, with said ring gear and with said drum.

4. The assembly according to claim 2, wherein said first and second grooved profiles extend along at least one annular section, respectively, of said ring gear and of said drum.

5. The assembly according to claim 2, wherein said first and second grooved profiles are coupled with play so as to provide a form-fit coupling.

6. The assembly according to claim 2, wherein said first and second grooved profiles are coupled with an interference fit, the second grooved profile being provided on the drum by deformation and/or removal of material by way of forced keying of the ring gear provided with the first grooved profile.

7. The assembly according to claim 1, wherein said at least one first recess and said at least one second recess are defined integrally, respectively, with said ring gear and with said drum.

8. The assembly according to claim 1, wherein said connecting means comprises a plurality of said first recesses, where each one of the plurality of said first recesses faces a respective second recess so as to define an accommodation seat for a corresponding obstacle element.

9. The assembly according to claim 8, wherein said first and second recesses are distributed along at least one annular section, respectively, of said ring gear and of said drum.

10. A winch with geared transmission, wherein the winch comprises a drum and ring gear assembly, the drum and ring gear assembly comprising a drum that is substantially cylindrical and adapted to be actuated rotationally about a longitudinal axis of the drum, and a ring gear accommodated substantially coaxially inside said drum, where the drum and the ring gear are mutually associated so as to rotate integrally about said longitudinal axis by virtue of a connecting means, and wherein said connecting means is of a positive and/or a direct friction type.

11. The winch according to claim 10, wherein the connecting means comprises one or more lobes that extend radially outward.

12. The winch according to claim 11, wherein the one or more lobes are integral to the ring gear.

13. The winch according to claim 12, wherein the connecting means further comprises corresponding recesses formed into the drum for receiving the one or more lobes.

14. The winch according to claim 10, wherein the connecting means comprises one or more recesses formed into an exterior surface of the ring gear that contacts the drum.

15. A drum and ring gear assembly, comprising:

a drum;

a ring gear that is positioned substantially coaxially inside the drum, wherein the drum and the ring gear are connected via a connecting means, wherein the connecting means is formed into both an exterior surface of the ring gear and a surface of the drum directly facing the exterior surface of the ring gear, wherein one or more recesses formed into the exterior surface of the ring gear face corresponding recesses formed into the surface of the drum, and wherein the one or more recesses formed into the exterior surface of the ring gear and the corresponding recesses formed into the surface of the drum are recessed away from each other.

16. The drum and ring gear assembly of claim 15, wherein the connecting means formed into the exterior surface of the ring gear comprises the one or more recesses formed into the exterior surface of the ring gear that are recessed away from the surface of the drum.

17. The drum and ring gear assembly of claim 15, wherein the connecting means comprises one or more obstacle elements that are interposed between the one or more recesses formed into the exterior of the ring gear and the corresponding recesses formed into the surface of the drum.

18. The drum and ring gear assembly of claim 17, wherein the connecting means comprises one or more lobes integrally formed into the ring gear, and wherein the one or more lobes extend radially outward from the ring gear towards the surface of the drum.

* * * * *